(12) United States Patent
Lo Zupone et al.

(10) Patent No.: US 11,215,159 B2
(45) Date of Patent: Jan. 4, 2022

(54) KINETIC MODULAR MACHINE FOR PRODUCING ENERGY FROM FLUID FLOWS

(71) Applicant: MAZO ENERGY TECH LTD, London (GB)

(72) Inventors: Giacomo Francesco Lo Zupone, Conversano (IT); Enrico Fiore, Vigonza (IT); Silvio Barbarelli, Rende (IT); Teresa Castiglione, Spezzano Della Sila (IT)

(73) Assignee: MAZO ENERGY TECH LTD, London (GB)

( * ) Notice: Subject to any disclaimer, the term of this patent is extended or adjusted under 35 U.S.C. 154(b) by 0 days.

(21) Appl. No.: 17/047,321

(22) PCT Filed: Apr. 18, 2019

(86) PCT No.: PCT/IT2019/050078
§ 371 (c)(1),
(2) Date: Oct. 13, 2020

(87) PCT Pub. No.: WO2019/202622
PCT Pub. Date: Oct. 24, 2019

(65) Prior Publication Data
US 2021/0156352 A1 May 27, 2021

(30) Foreign Application Priority Data
Apr. 18, 2018 (IT) .................. 102018000004645

(51) Int. Cl.
*F03B 13/10* (2006.01)
*F03B 3/04* (2006.01)
(Continued)

(52) U.S. Cl.
CPC ............ *F03B 13/10* (2013.01); *F03B 3/04* (2013.01); *F03B 15/00* (2013.01); *F03B 17/065* (2013.01);
(Continued)

(58) Field of Classification Search
CPC .......... F03B 13/10; F03B 3/04; F03B 17/065; F03B 15/00; H02K 7/1823;
(Continued)

(56) References Cited

U.S. PATENT DOCUMENTS 3,986,787 A * 10/1976 Mouton, Jr. .......... F03B 17/061
415/7
4,335,093 A * 6/1982 Salomon ................. F03D 9/19
423/644
(Continued)

FOREIGN PATENT DOCUMENTS

WO 2015175535 11/2015
WO 2017063070 4/2017

OTHER PUBLICATIONS

Silvio Barbarelli et al: "Analysis of the equilibrium conditions of a double rotor turbine prototype designed for the exploitation of the tidal currents", Energy Conversion and Management., vol. 87, Nov. 1, 2014 (Nov. 1, 2014), pp. 1124-1133, XP055551759, GB ISSN: 0196-8904, DOI: 10.1016/j.enconman.2014.03.046 cited in the application paragraph [0002]; figures 1-6.
(Continued)

*Primary Examiner* — Charles Reid, Jr.
(74) *Attorney, Agent, or Firm* — Carmel Patent Agency; Robert Ballarini (57) ABSTRACT

A kinetic modular machine for producing electricity from flows, either mono or bi-directional, moving at different speeds, includes one or more turbines that are "open center" and coaxial; a floating/positioning system; and a connection
(Continued)

between the kinetic modular machine and a docking. Each turbine has a rotor, a stator, and a synchronous generator. In different configurations, the turbines are structurally, mechanically and electrically independent. The floating/positioning system includes a floater, a wing, and a fixture linking the turbines to the floater, implementing the control of the rotational axes (roll, pitch, yaw), with the wing keeping the machine at a given distance from the shore and the fluid surface. The modular design, having independent turbines, allows for a flexible design, keeping the installation and maintenance costs low.

4 Claims, 9 Drawing Sheets

(51) Int. Cl.
    *F03B 15/00*     (2006.01)
    *F03B 17/06*     (2006.01)
    *H02K 7/18*     (2006.01)

(52) U.S. Cl.
    CPC ...... *H02K 7/1823* (2013.01); *F05B 2220/706* (2013.01); *F05B 2240/9176* (2020.08); *F05B 2240/93* (2013.01); *F05B 2240/95* (2013.01)

(58) Field of Classification Search
    CPC ........ F05B 2220/706; F05B 2240/9176; F05B 2240/93; F05B 2240/95
    USPC ........................................ 290/42, 43, 53, 54
    See application file for complete search history.

(56) References Cited

U.S. PATENT DOCUMENTS

| | | | | |
|---|---|---|---|---|
| 5,440,176 | A * | 8/1995 | Haining | F03B 17/061 |
| | | | | 290/54 |
| 7,146,918 | B2 * | 12/2006 | Meller | F03B 17/062 |
| | | | | 114/39.26 |
| 10,337,486 | B2 * | 7/2019 | White | H02J 7/1415 |
| 2009/0096216 | A1 * | 4/2009 | Power, III | F03D 9/28 |
| | | | | 290/54 |
| 2010/0133844 | A1 | 6/2010 | Pearce | |
| 2012/0211990 | A1 * | 8/2012 | Davey | F16C 32/0417 |
| | | | | 290/54 |
| 2014/0353971 | A1 * | 12/2014 | Davey | F16C 32/044 |
| | | | | 290/52 |
| 2018/0010573 | A1 | 1/2018 | Stähle | |

OTHER PUBLICATIONS

Giacomo Lo Zupone et al: "Lcoe evaluation for a tidal kinetic self balancing turbine: Case study and comparison", Applied Energy., vol. 185, Feb. 1, 2016 (Feb. 1, 2016), pp. 1292-1302, XP055551765, GB ISSN: 0306-2619, DOI: 10.1016/j.apenergy.2016.01.015 cited in the application paragraph [0003]; figures 2-5.

* cited by examiner

KINETIC MODULAR MACHINE FOR PRODUCING ENERGY FROM FLUID FLOWS

TECHNICAL FIELD

The present invention concerns the turbines or fluid kinetic floating turbines systems with a single and/or double rotor "open center" (without central shaft and/or hub), in other words the turbines equipped with a floater positioning system, capable to produce electricity from fluid flows, either one or bi directional one, operating at different current speeds.

In particular, the invention involves the turbine, the floating and rotational (around the yaw, roll and pitch axes) system, the machine position with respect to the shore and the flow.

BACKGROUND ART

As known, it is possible to build SintEnergy's turbines for producing electricity from tidal streams. They consist of some kinetic machines with mobile component parts allowing to produce energy full immersed in water and moored to the shore by means of a rope subjected only to a tensil stress driven by a rigid rode (on shore technology). The working principle is quite similar to a kite: the machine is in equilibrium in the water and doesn't change the position during the operation; it is also able to self control its position even when the flow direction and intensity changes, maintaining the rotational plan perpendicular to the flow.

Such a SintEnergy turbine is designed as open center and consists of two counter rotating coaxial rotors, of a single stator (unibody stator solution), two synchronous, independent, built in generators, a central wing (also named positioning wing), installed on the center of the stator, and a floater (buoy).

Each generator consists of two steel rings, one built in to the rotor (rotor steel ring) and the second to the stator (stator steel ring). These rings respectively house the permanent magnets and the coils.

Both rotors, functionally constrained to the stator, are only electrically fully independent. During the operations, when the flows hits the machine, both rotors run inside the stator, together with the generators, producing electricity. The rotation is allowed by a number of balls, at a datum gaps among them, along some races made on the flanks of the rotors.

The floater and the central wing allow to partially manage, in an adaptative mode, the machine position with respect to the water surface and the shore.

A disadvantage of the cited conventional technology is the partial transient management related to the startup of the machine and when a change of the flow direction occurs.

Particularly, the above solution, in the author's opinion, doesn't allow to fully manage the machine axes rotations (yaw, roll, pitch) implying any potential fluctuations risky for the "in water" machine stability and equilibrium, as well as the energy production.

More potential troubles can come from:
- the high component elements production costs due to the necessity of complex manufacturing procedures and machines, mainly for the unibody stator manufacturing;
- the stop of the energy production even in case of planned maintenance or unattended failure of just one rotor, due to the fact that both rotors are functionally connected to the stator;
- the use of low aspect central wing, with low aerodynamic efficiency, due to the small central hole;
- the high installation costs, the reduced available shipping ways and manageability of the machine due to the length of the whole anchoring system, as requested to stay off the boundary layer (see S. Barbarelli, G. Florio, M. Amelio, N. M. Scornaienchi, A. Cutrupi, G. Lo Zupone *Transients analysis of a tidal currents self-balancing kinetic turbine with floating stabilizer* Applied Energy 160 (2015) 715-727);
- the high building complexity due to the central deflector, implying a complex device allowing to turn the machine when a flow direction change occurs;
- the machine efficiency is reduced due to turbulences induced by the central wing;
- the low mechanical efficiency during in the operation position (with the swept area in front of the flow) due to the balls bearing, located on the flanks of the rotors: for this reason each rotors weight affect the bearing so it works under cutting loads, increasing the mechanical friction and the cut in speed (the speed at which the machine starts producing energy) and, consequently, reducing the produced energy.

For the above reasons it is necessary to find innovative solutions in order to exceed the said limitations.

DISCLOSURE OF INVENTION

The present invention aims to exceed any previous limitations, already known (closest prior art) in the fluid kinetic machines mainly due to the actual configuration.

The main objective of the present invention, as in the attached claims, is to build a kinetic machine, able to produce energy from fluid flows consisting of a component (module) made of one or more turbines structurally, mechanically and electrically independent, reciprocally connected with screwed systems or pressure/click fixtures, with a built in synchronous generator, in order to reduce the stop of the machine and the loss of energy production when a failure of one or more turbines occurs.

A second objective, depending on the first one, is to build a modular kinetic machine for the energy production from flow currents, assembling a number of component parts, in order to make easier the assembly phases (reducing the number of phases) and off shore maintenance, consequently reducing the risks, the time and the costs of production and management.

A third objective, depending on the previous one, it to make a number of componentized parts (modulus), different and "taylor made" depending on the requirements such the site characteristics or the load.

A forth objective is to supply a machine with characteristics of structural, chemical/physical/mechanical strength ideal with respect to operating environment, ensured by the shape and kind of made of materials, diversified related to the specific purpose.

A fifth objective is the full and right position control of the machine, also during the transients, achievable by a location of the positioning wing outside the turbine and a suitable design and modelling of the floater.

A sixth objective is to increase the produced energy reducing the mechanical friction over the rotors.

A seventh objective is to optimize the produced energy taking in consideration some comparative Computational Fluid Dynamic (CFD) results.

One more objective is to use, for manufacturing and assembly this kinetic machine, all the assembly strategies, parts, manufacturing and devices already known, ie but not the only ones, screws, holdfast (mechanical and electrical), terminal, joining the parts of each machine or between machines, or for the customer interface.

Based on this invention, the innovative fluid kinetic machine allows to better operate converting the the energy from fluid streams, like the tidal or rivers ones, resulting more efficient and profitable compared to the actual technology state of the art, because it consist of:

one or more turbines, as well as electrically are also structurally and mechanically independent making the machine fully modular;

a floating/positioning system implementing the control of roll, pitch and yaw as well as the position with respect of the shore and water surface;

a central hole free of any encumbrance and designed following the CFD results in order to optimize the energy production, to reduce the wake consequences behind the turbine and also the environmental impact.

BEST MODE FOR CARRYING OUT THE INVENTION

The following descriptions are the minimum instructions whose an expertise person needs to build the machine, consequently any other improvements/modifications can be introduced without any preconceptions to the subject of the subject of the innovation and without vary the related field of protection as defined on the claims.

Figure 1:
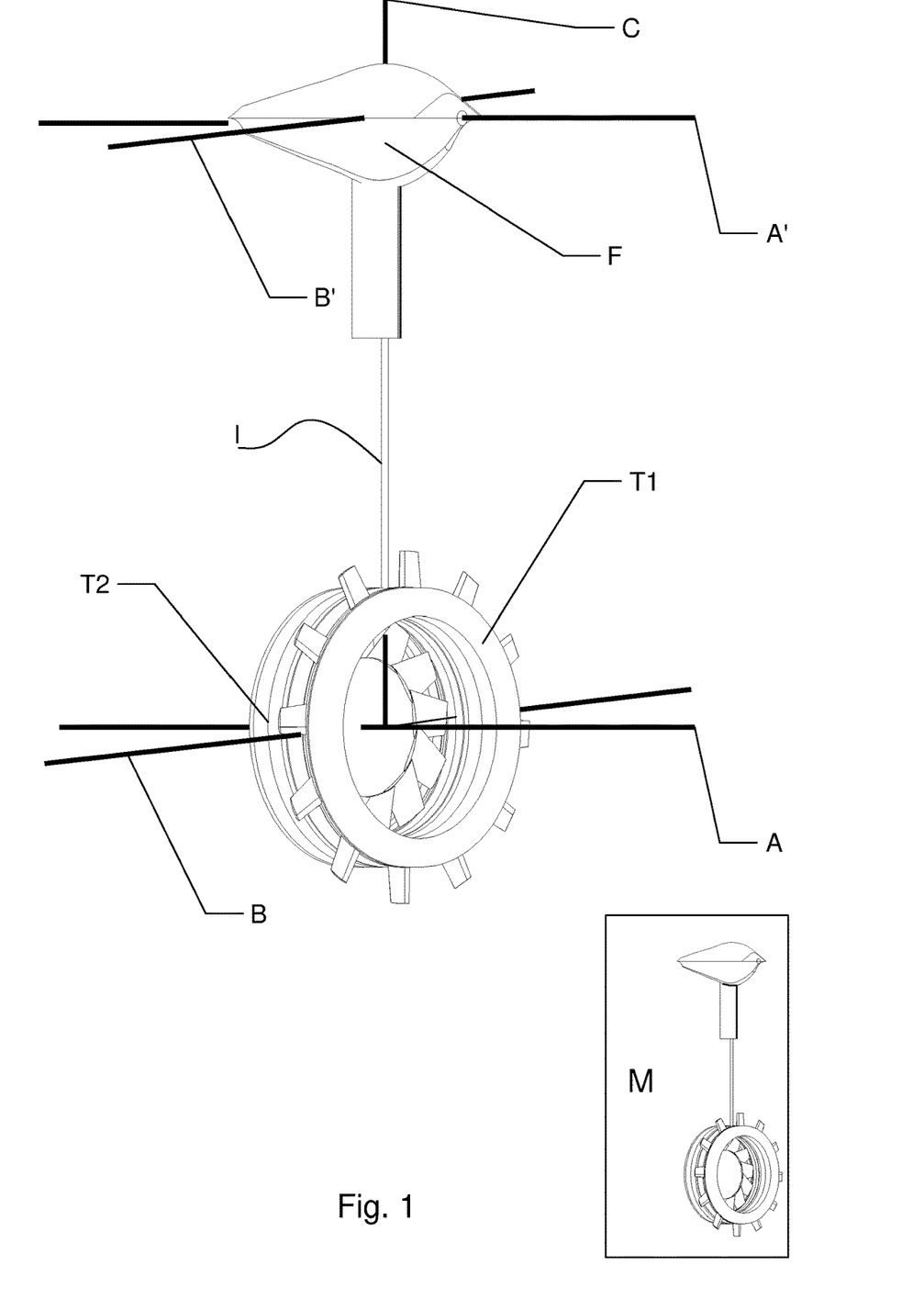
FIG. 1 is an axonometric view displaying a machine as per invention.

The machine of the finding, generically defined as (M) in FIG. 1, is a floating one, i.e. immersed in water, but not anchored to the shore bed, just connected to the shore by a system allowing to balance the drag exerted over the machine itself by the flow.

Figure 5:
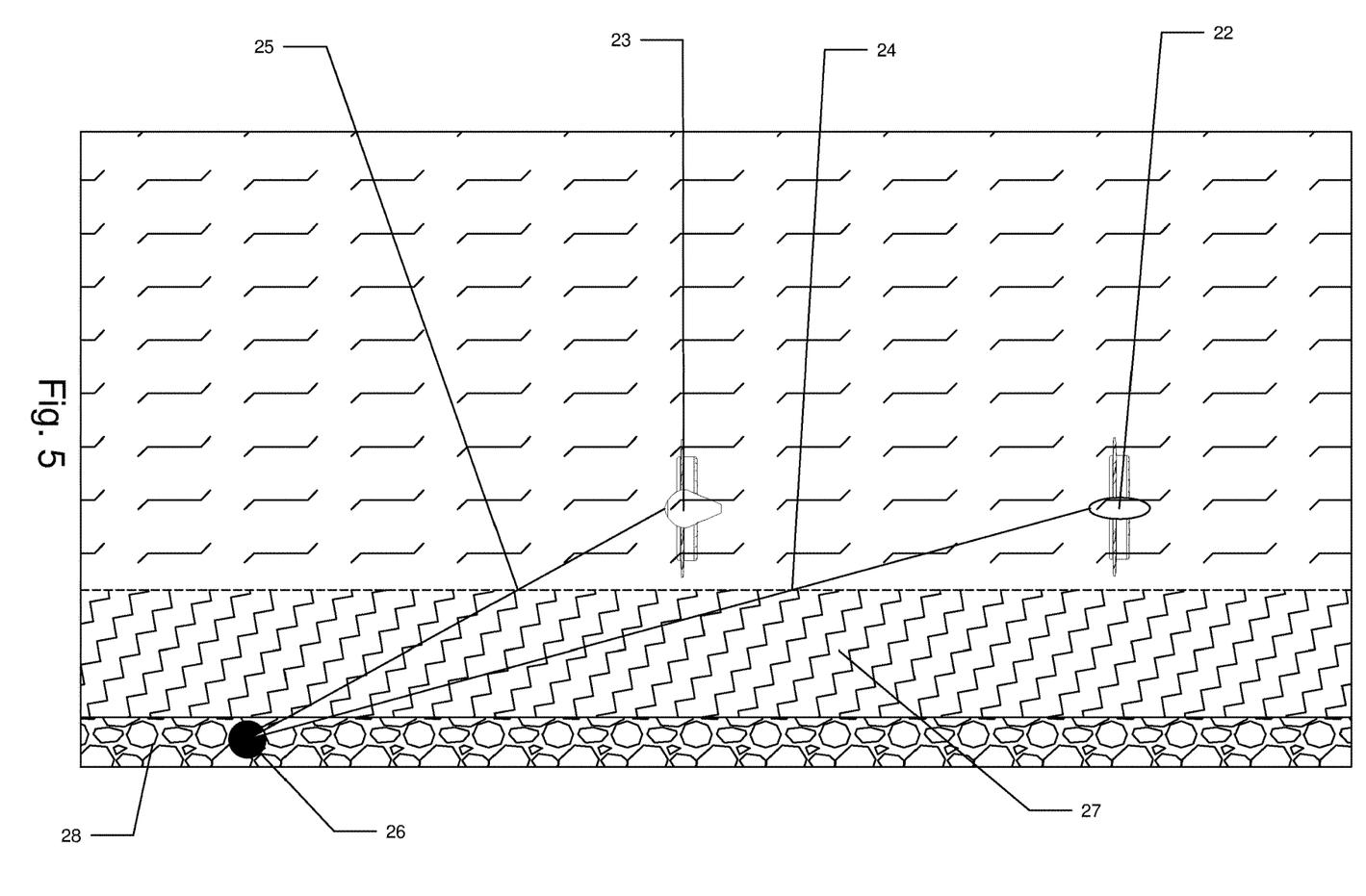
FIG. 5 shows the more profitable purpose of anchoring of the the invention compared to the previous art.

The machine (M) following the invention consists of two coaxial turbines counter rotating, one with external blades (T1) and the other with internal blades (T2); a floating/positioning system; a connection system between machine and shore (FIG. 5 shows the working principle).

Figure 2:
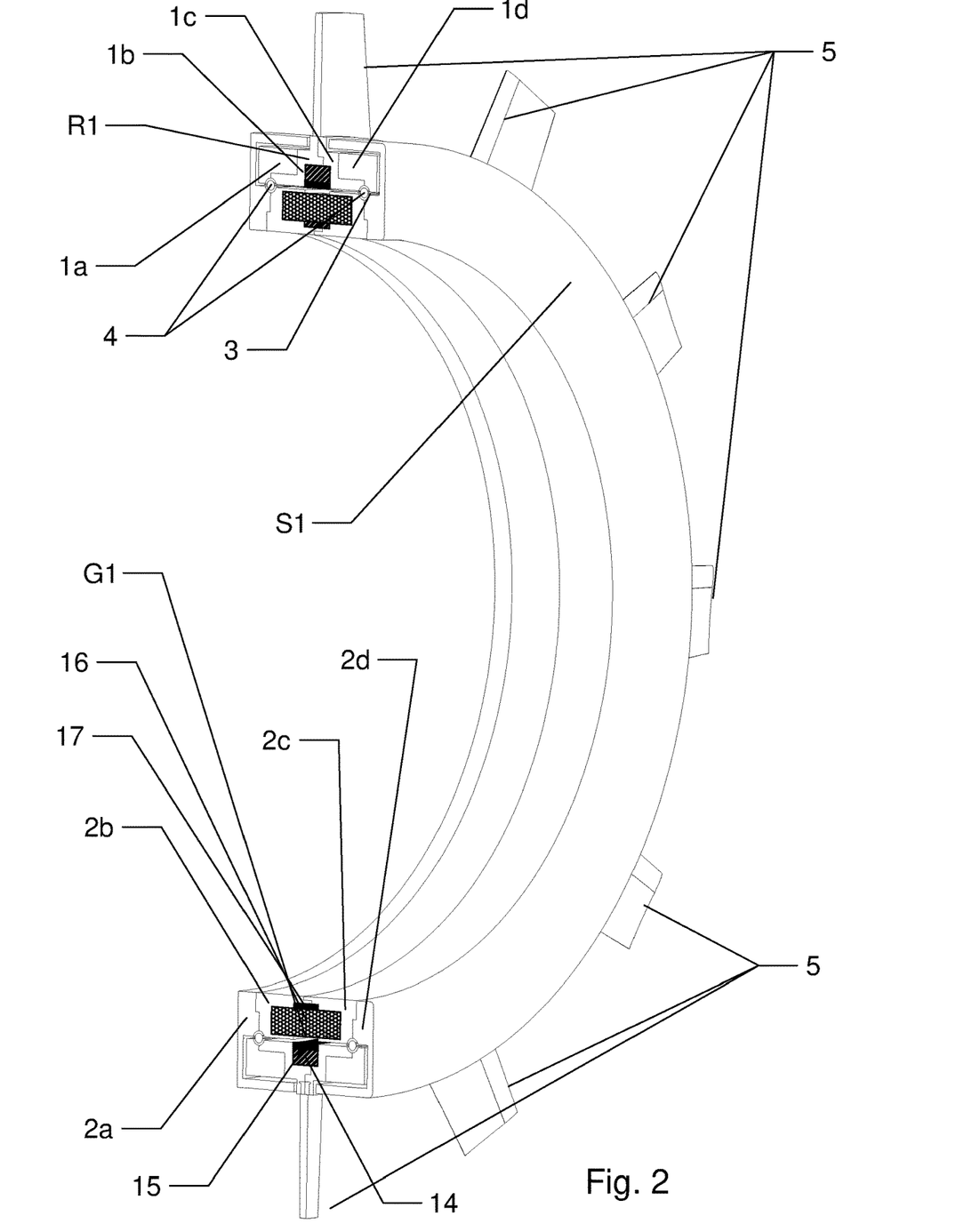
FIG. 2 is an axonometric view of the external bladed turbine (T1), cross sectioned by a diametral plan perpendicular to the rotational plan.

The turbine (T1), as shown in FIG. 2, consists of a rotor (R1), a stator (S1) and a synchronous generator (G1).

The rotor (R1), round shaped, is composed of four rings (1a, 1b, 1c, 1d). It rotates inside the stator (S1) housing over the external perimeter the blades (5).

The blades (5), of suitable aerodynamic shape and section and at low aspect ratio (less than two), are characterized by a tapered shape with root chord larger or equal than the tip one. The connection blade-rotor is at section with the longer chord.

The stator (S1) is a case torus shaped assembled with four rings (2a, 2b, 2c, 2d).

Figure 8:
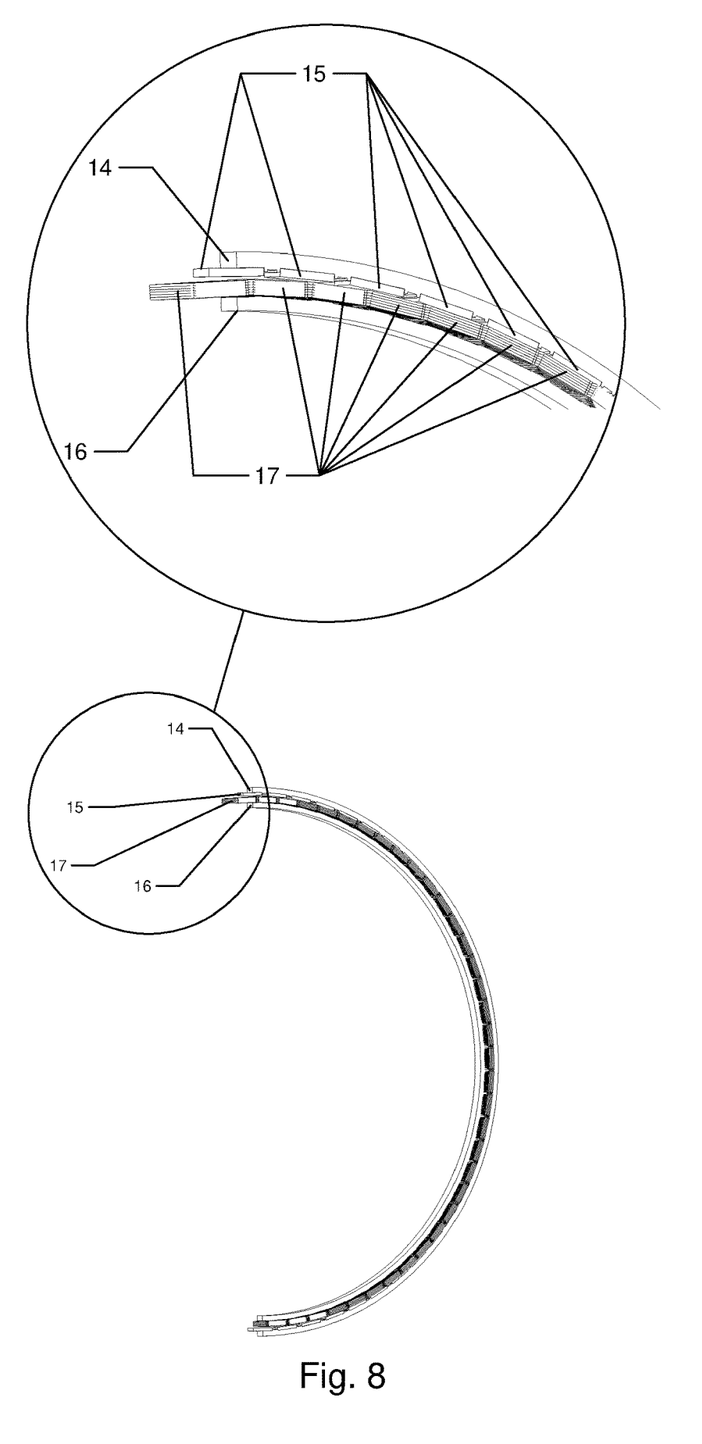
FIG. 8 is an axonometric view of the generator (G1), cross sectioned by a diametral plan perpendicular to the rotational plan, built in the turbine (T1)

The generator (G1), shown in FIG. 8, consists of a metal support ring (14), housed inside the rotor (R1), where are installed a number of permanent magnets (15) and a metal support ring (16), housed inside the stator (S1), where are installed a number of copper coils (17), in the same quantity as the magnets.

The quantity of the rotor blades, the magnets and coils can vary depending on the design purpose and specifications.

The rotation of the rotor (R1) inside the stator (S1) is provided by means of rotating elements (4) of spherical, cylindrical or other suitable shape, order to reduce the mechanical friction between stator and rotor. Such elements, in variable quantity depending on the purpose and design specifications, run along circular races made partially on the rotor, near to the blades root, and partially on the stator (as shown in FIG. 2); these elements are positioned at the same mutual suitable distance by a spacer (3). As optional configuration, instead of the rotating elements, it is possible, depending on the purpose, it is possible to introduce, or use at the same time, any other devices using other physical phenomena (as example, but not the only one, the magnetic levitation), in order to reduce the friction.

Figure 3:
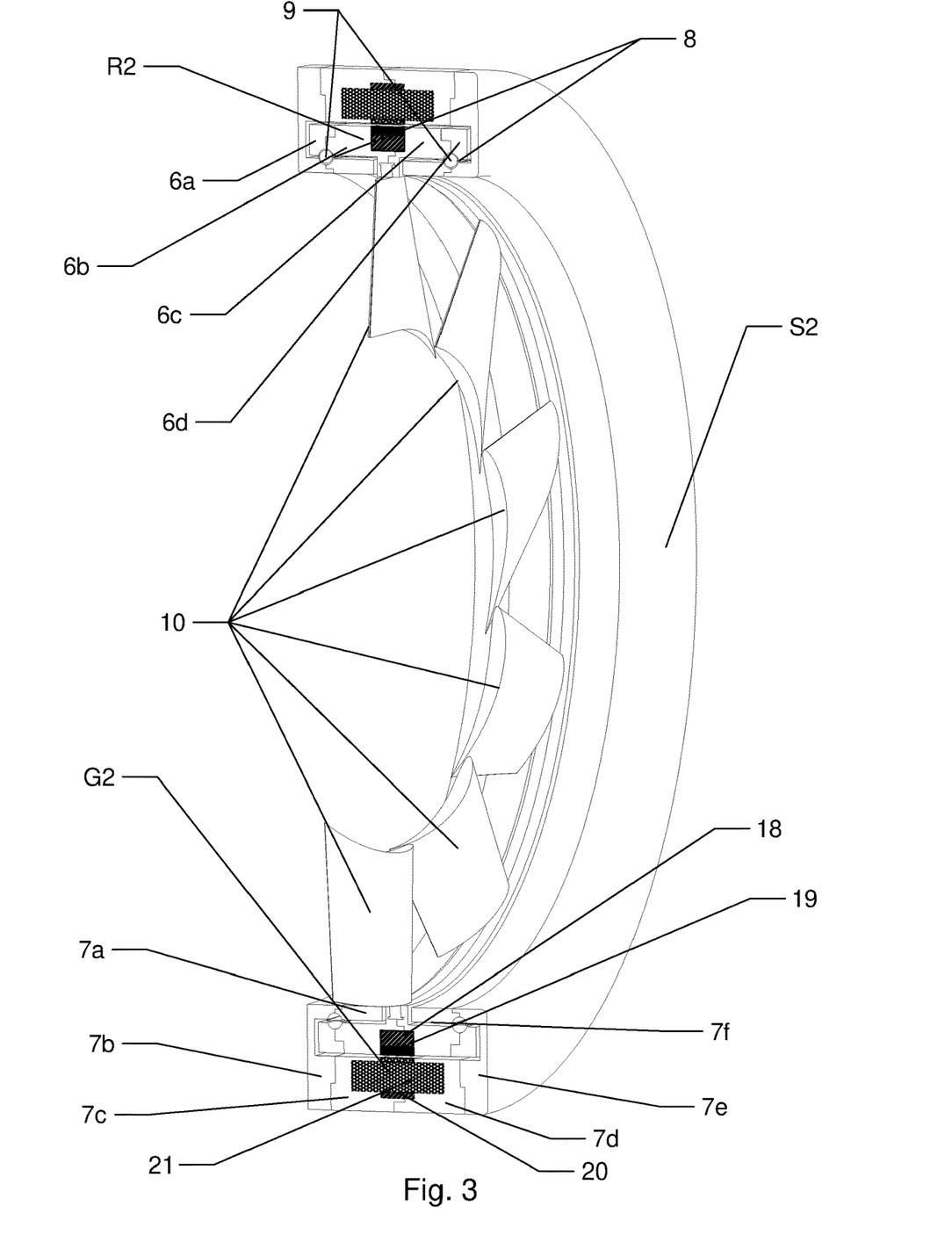
FIG. 3 is an axonometric view of the internal bladed turbine (T2), cross sectioned by a diametral plan perpendicular to the rotational plan.

The turbine (T2), as shown in FIG. 3, consists of a rotor (R2), a stator (S2) and a synchronous generator (G2).

The rotor (R2), round shaped, is composed of four rings (6a, 6b, 6c, 6d). It rotates inside the stator (S2) housing in the internal perimeter the blades (10). It rotates inside the stator (S2) housing in the internal perimeter the blades (10).

The blades (10), of suitable aerodynamic shape and section, are characterized by a tapered shape with root chord smaller or equal than the tip one. The connection blade-rotor is at section with the smaller chord.

The stator (S2) is a case torus shaped assembled with six rings (7a, 7b, 7c, 7d, 7e, 7f).

Figure 9:
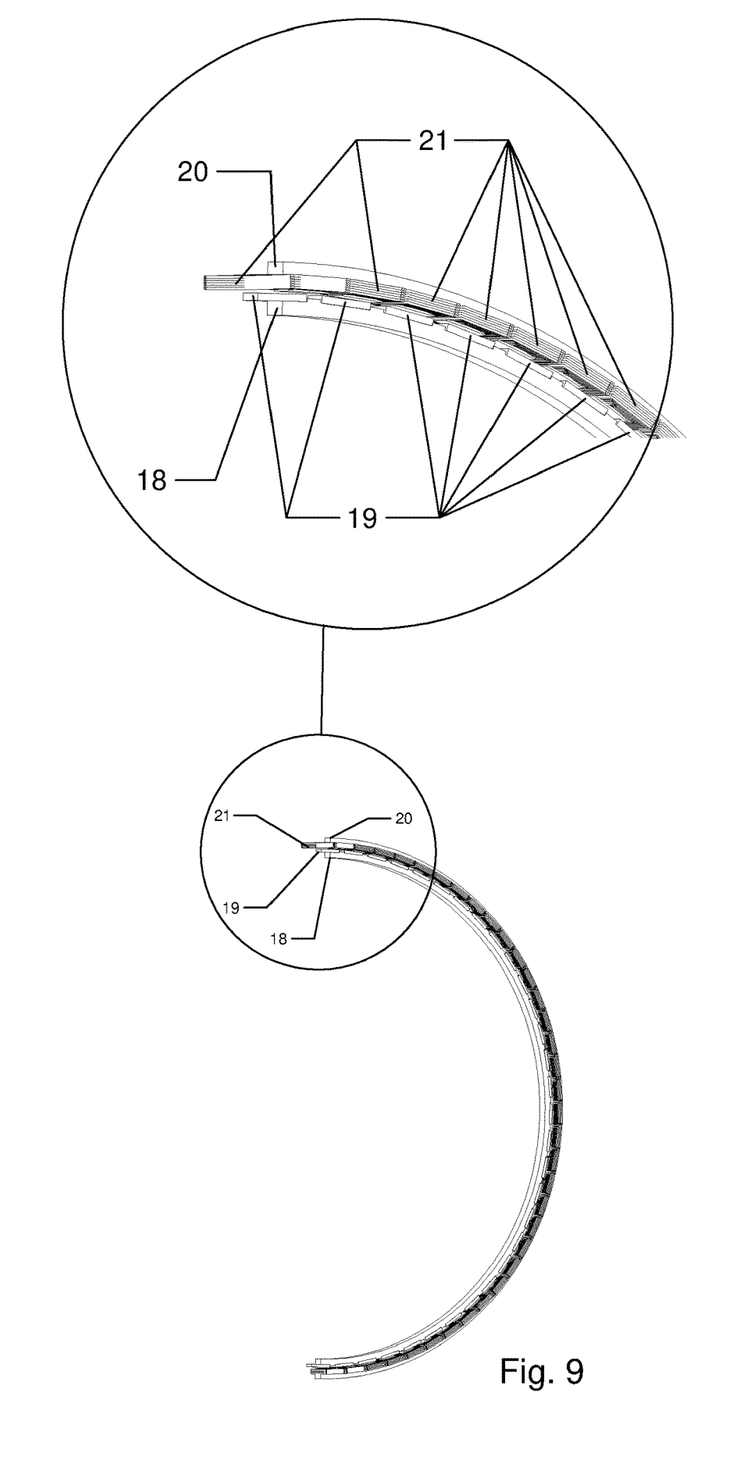
FIG. 9 is an axonometric view of the generator (G21), cross sectioned by a diametral plan perpendicular to the rotational plan, built in the turbine (T2).

The generator (G2), shown in FIG. 9, consists of a metal support ring (18), housed inside the rotor (R2), where are installed a number of permanent magnets (19) and a metal support ring (20), housed inside the stator (S2), where are installed a number of copper coils (21), in the same quantity as the magnets.

The quantity of the rotor blades, the magnets and coils can vary depending on the design purpose and specifications.

The rotation of the rotor (R2) inside the stator (S2) is provided by means of rotating elements (9) of spherical, cylindrical or other suitable shape, order to reduce the mechanical friction between stator and rotor. Such elements, in variable quantity depending on the purpose and design specifications, run along circular races made partially on the rotor, near to the blades root, and partially on the stator (as shown in FIG. 3); these elements are positioned at the same mutual suitable distance by a spacer (8). As optional configuration, instead of the rotating elements, it is possible, depending on the purpose, it is possible to introduce, or use at the same time, any other devices using other physical phenomena (as example, but not the only one, the magnetic levitation), in order to reduce the friction.

Figure 4:
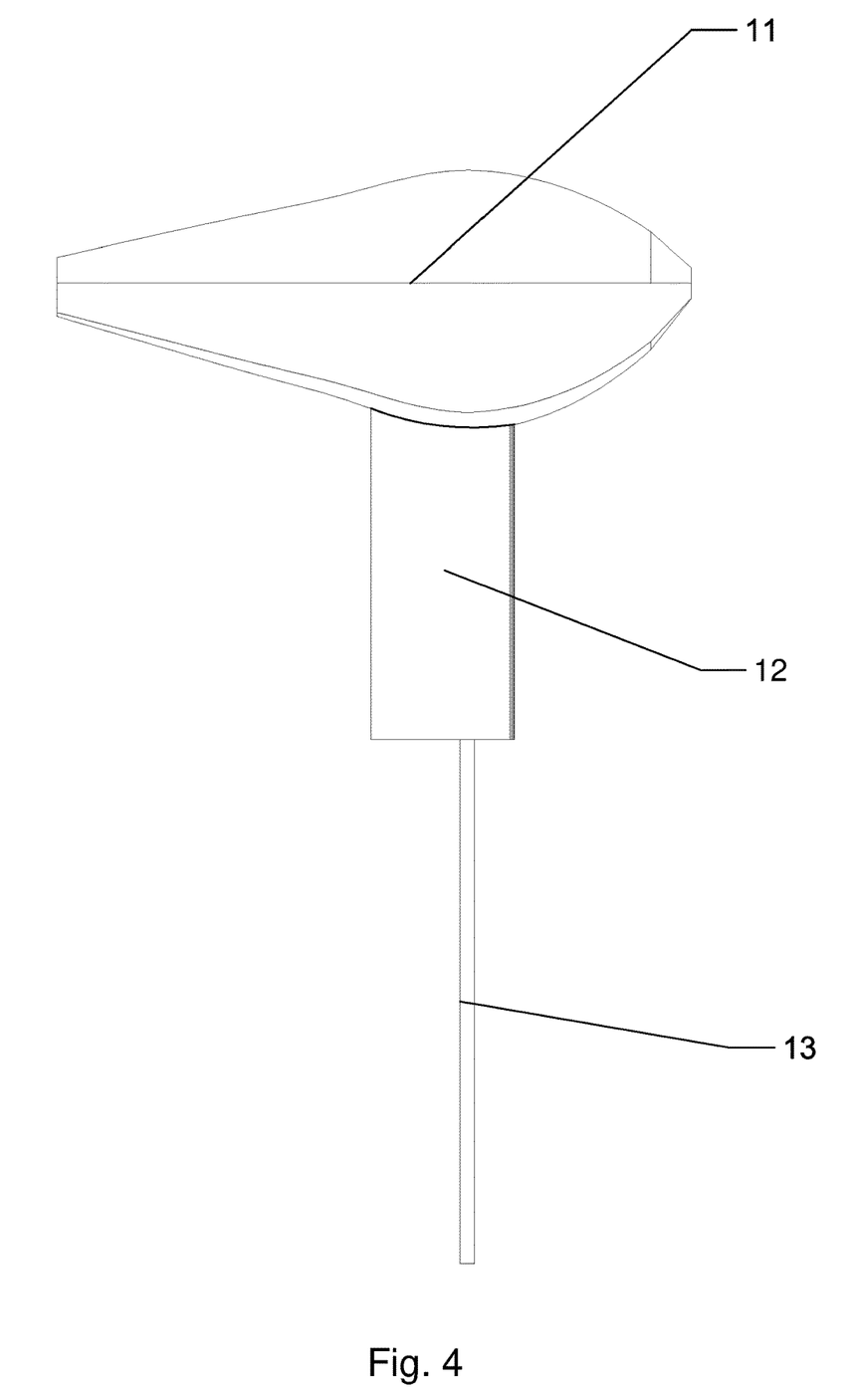
FIG. 4 is a side view of the floating/positioning system (F) of the machine.

The floating/positioning system (F), as shown in FIG. 4, consists of a floater (11), a positioning wing (12) and a fixture (13) connecting the machine to the floater.

The synergic operation provided by the cited components (11) (12) and (13) allows to control the machine at the datum distance from the water surface and shore, as per design requirements, as shown in FIG. 5.

In particular:

- the floater (11), suitably designed and modelled, provides the right depth of the machine and the stability during the transients in order to optimize the energy production (see: S. Barbarelli, G. Florio, M. Amelio, N. M. Scornaienchi, A. Cutrupi, G. Lo Zupone *Transients analysis of a tidal currents self-balancing kinetic turbine with floating stabilizer* Applied Energy 160 (2015) 715-727);
- the positioning wing (12) allows controlling the machine position with regard to the shore (see: Barbarelli S., Amelio M., Castiglione T., Florio G., Scornaienchi N. M., Cutrupi A., Lo Zupone G., *Analysis of the equilibrium conditions of a double rotor turbine prototype designed for the exploitation of the tidal currents*, Energy Conversion and Management, 2014, Vol. 87, pp. 1124-1133—doi:10.1016/j.egypro.2014.11.1005);
- the connecting fixture machine-floater (13) consists of one or more beams, or any other support structure useful for the purpose, and it is designed for providing the optimal machine depth, at which the maximum suitable flow speed is achieved as required from the design.

The innovative aspects of the present invention, compared to the closest prior art, are:

Modularity

Structural, mechanical and electrical turbine independency, allowing the machine to be fully modular, proves to be the machine itself more profitable in terms of components manufacturing and assembling and also maintenance. Mainly, the modularity concept provides a stop operation time reduction, to pull out one or more fault turbines meanwhile the remaining ones can continue the production even in a lower quantity.

Floating/Positioning System

The floating/positioning system (F) covers the control of the roll, pitch and yaw of the machine (M), thanks to the configuration and the innovative features of the system (F). Its configuration, as per invention, is specifically favourable because, as shown in FIG. 1, the machine (M) acts as a pendulum hinged at roll axis A' and pitch axis B' (depending on the considered oscillation plan); meanwhile the rotational control around the yaw axis C is performed by the floater (11) shape and by the fluid dynamics performances of the positioning wing (12). In particular:

- the floater volume (11), due to the volume of the moved fluid by the immersed machine, provides to avoid the machine sinks; meanwhile, the shape, due to specific fluid dynamic requirements as shown in figures only for example purpose, allows to maintain the right machine position during the small oscillations around the axes A' and B';
- the positioning wing (12), located outside the turbine, can be designed at higher aspect ratios (more than one), in order to operate with higher positioning angles and linking machine-shore fixture shorter, as shown in FIG. 5 (cfr. S. Barbarelli, G. Florio, M. Amelio, N. M. Scornaienchi, A. Cutrupi, G. Lo Zupone *Transients analysis of a tidal currents self-balancing kinetic turbine with floating stabilizer* Applied Energy 160 (2015) 715-727);
- the length "l" of the element (13), measured from the rotational axis A of the turbine, fixes the oscillation period of the machine, once known mass and momentum of inertia of the the machine itself.

Central Hole

The optimal sizing of the central hole is based on a comparative analysis performed by CFD, referring to a conventional turbine "wind like", with central hub, a turbine open center single rotor, as per invention, and a double rotor turbine, as per invention, demonstrate that the last one is profitable in terms of energy production.

It is in fact known that the performances, in terms of energy production, depend, at same other factors, on the Power Coefficient Cp and the swept area S.

Figure 6:
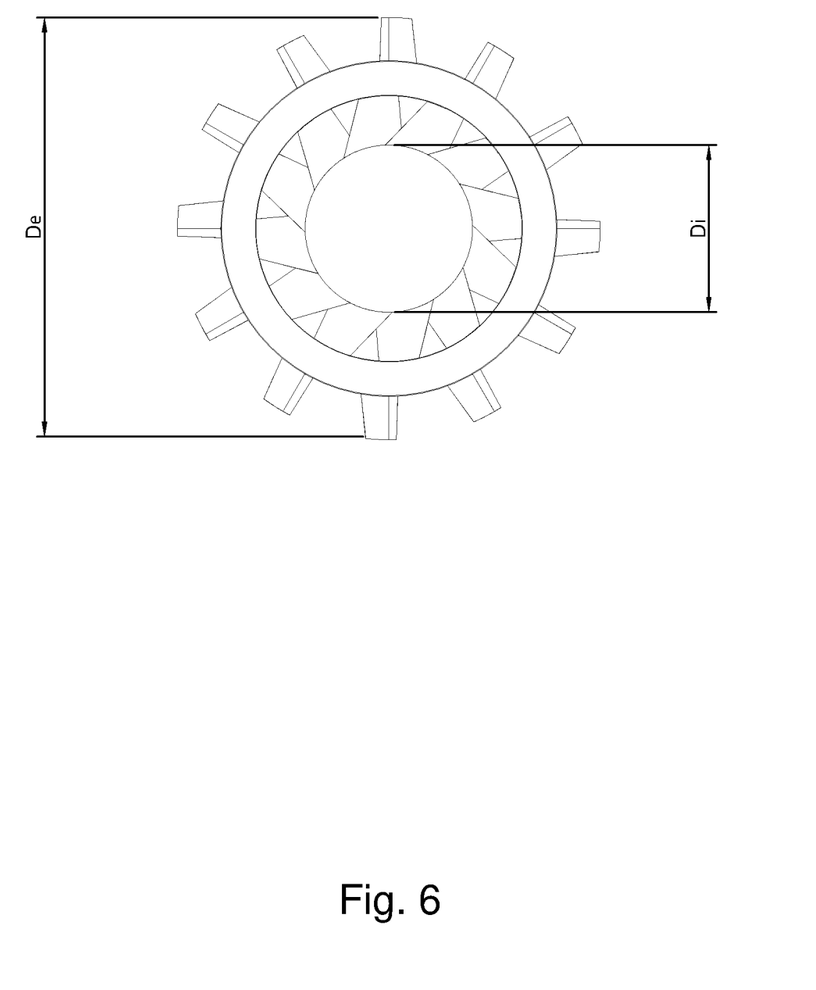
FIG. 6 is a frontal view of the double turbine as assembled.

The results show that, by increasing the central hole diameter Di, as shown in FIG. 6, maintaining the external diameter De of the turbine (T1), an open center turbine provides a Cp higher than a "wind like" (with central hub). Anyway the energy production is lower, in the open center case, due to the fact that the swept area reduces when the central hole diameter increases.

A good settlement, between the advantages taken from the conventional technology and the ones offered from the open center solution, following the obtained results, is provided adopting the open center solution combined with the double rotor configuration, taking the advantages of suitable energy production of the innovative technology (as shown in Giacomo Lo Zupone, Mario Amelio, Silvio Barbarelli, Gaetano Florio, Nino Michele Scornaienchi, Antonino Cutrupi *LCOE evaluation for a tidal kinetic self balancing turbine: Case study and comparison* Applied Energy 185 (2017) 1292-1302), on the current invention is based.

Indeed, this solution allows to achieve, despite a lower swept area, an increase of Cp and energy production compared to the ones of the conventional technology, with more economic advantages (as shown in Giacomo Lo Zupone, Mario Amelio, Silvio Barbarelli, Gaetano Florio, Nino Michele Scornaienchi, Antonino Cutrupi *LCOE evaluation for a tidal kinetic self balancing turbine: Case study and comparison* Applied Energy 185 (2017) 1292-1302).

It is also known that the central hole solution reduces the fauna impact and, as demonstrated by the CFD results, the wake phenomena, behind the machine, are significantly reduced.

Figure 7:
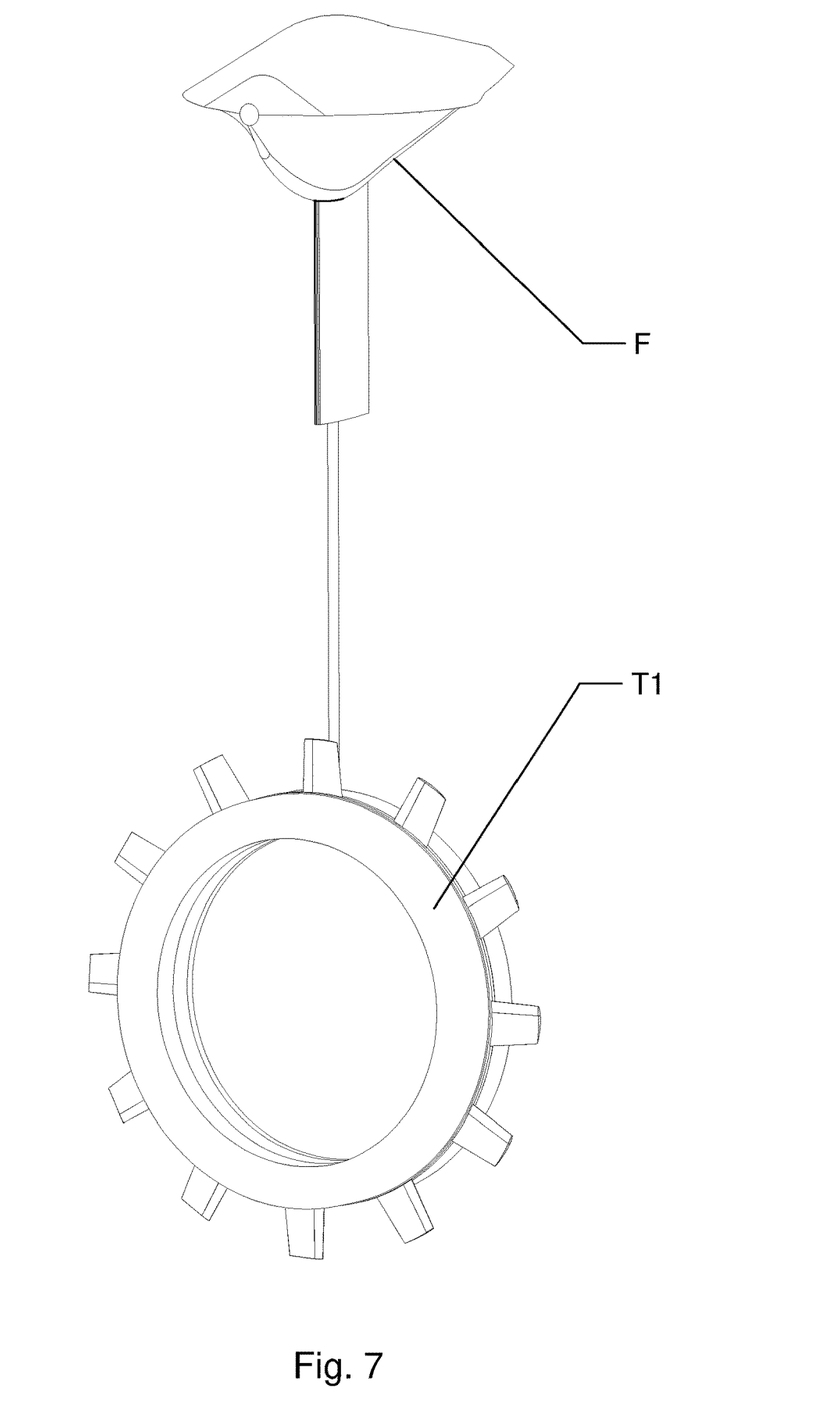
FIG. 7 is an axonometric view of a version of a single turbine machine (M) as per invention.

FIG. 7 depicts one more example of practical execution of the invention involving the principle just displayed. A single turbine configuration is more performing, in terms of Power Coefficient Cp, compared to the double rotor configuration previously considered, and so it is a profitable solution for low cost purposes and/or small users.

Such a solution is mostly profitable for some purposes requiring a number of installed turbines on the same anchoring structure, including floating/positioning systems custom designed.

SEQUENCE LISTING PART OF THE DESCRIPTION

M machine
T1 turbine: external bladed
T2 turbine: internal bladed
F floating/positioning system
A turbine rotational axis
B turbine pitch axis
C yaw axis
A' machine roll axis
B' machine pitch axis 1 machine—floater lenght fixture
R1 rotor 1
1*a* ring 1
1*b* ring 2
1*c* ring 3
1*d* ring 4
S1 stator 1
2*a* ring 1
2*b* ring 2
2*c* ring 3
2*d* ring 4
3 balls spacer
4 balls
5 blades
G1 external bladed turbine generator
14 generator rotor ring
15 magnet
16 generator stator ring
17 coil
R2 rotor 2
6*a* ring 1
6*b* ring 2
6*c* ring 3
6*d* ring 4
S2 stator 2
7*a* ring 1
7*b* ring 2
7*c* ring 3
7*d* ring 4
7*e* ring 5
7*f* ring 6
8 balls spacer
9 balls
10 blades
G2 internal bladed turbine generator
18 generator rotor ring
19 magnet
20 generator stator ring
21 coil
11 floater
12 positioning wing
13 fixture link machine-floater
22 prior art
23 new finding subject of present invention
24 anchoring element length of prior art
25 anchoring element length of new finding
26 anchoring base
27 boundary layer
28 shore
Di internal turbine diameter
De external turbine diameter

The invention claimed is:

1. A modular kinetic machine (M) for producing electricity from fluid flows, the modular kinetic machine being adapted to be floating, in a fluid, open center, with a swept area fully immersed and perpendicular to flow direction, comprising:
 a first turbine and a second turbine, one with external blades and the other with internal blades, which are coaxial and counter rotating and that are mechanically and electrically independent; the first turbine comprises a first rotor, a first stator and a first synchronous generator, the second turbine comprises a second rotor, a second stator and a second synchronous generator,
 a floating/positioning control device,
 a connection system,
 wherein each turbine is structurally, mechanically, and electrically independent,
 wherein the floating/positioning control device comprises at least a buoy, a positioning wing, and a fixture connecting the turbines to the buoy,
 wherein the buoy is configured to allow positioning of the modular kinetic machine in terms of optimal depth and stable transient mood; and
 wherein the positioning wing (12) is installed out of the turbine, in proximity to the buoy (11) and the buoy (11) is linked to the turbine by one or more beams (13) configured for linking,
 wherein the connection system is between the buoy and the shore.

2. The modular kinetic machine (M), according to the claim 1, wherein each rotor and stator comprise parts that are centered on a rotational axis of the modular kinetic machine.

3. The modular kinetic machine (M), according to the claim 1, wherein a number of blades is a maximum number for the proper functioning of the kinetic modular machine, so as to reduce a load for each blade and allow using materials having a lower structural strength and lower machine weight and costs.

4. The modular kinetic machine (M), according to the claim 1, wherein the two turbines have a center hole that is designed using a Di/De (external diameter/center hole diameter) ratio to provide a maximum available energy production.

* * * * *